United States Patent [19]

Lovelace

[11] Patent Number: 4,791,715

[45] Date of Patent: Dec. 20, 1988

[54] METHOD AND APPARATUS FOR ASSEMBLY OF CASSETTE PULLEY

[75] Inventor: Benjamin Lovelace, Santa Ana, Calif.

[73] Assignee: Cimco, Inc., Costa Mesa, Calif.

[21] Appl. No.: 33,677

[22] Filed: Apr. 3, 1987

[51] Int. Cl.⁴ .................. B23Q 3/00; B21D 53/26
[52] U.S. Cl. ............................ 29/464; 29/159 R; 29/714; 29/721; 356/400; 340/686; 250/561; 33/286; 33/645; 414/783; 414/224
[58] Field of Search .................... 29/159 R, 806, 712, 29/709, 714, 721, 464, 466, 467; 414/222, 224, 754, 783; 356/399, 401, 400; 340/540, 686; 33/286, 645; 250/561

[56] References Cited

U.S. PATENT DOCUMENTS 1,754,205  4/1930  Jones ................................. 29/159 R
3,616,519 11/1971  Hanshew ............................ 29/712

Primary Examiner—P. W. Echols
Attorney, Agent, or Firm—Gausewitz, Carr & Rothenberg

[57] ABSTRACT

A cassette pulley is assembled from a flange part having three assembly pins which are received in corresponding holes of a hub part. The hub part has a number of reinforcing ribs which divide the bottom of the hub part into a number of recesses which are conveniently employed to hold the hub part on a group of hub holding stub shafts during assembly. Because there are more recesses than holding stub shafts, the hub may assume more than one orientation relative to the stub shafts. In order to achieve proper relative orientation of hub and flange, the hub holder is formed with a hole that is aligned with one of the hub holes when the hub is in one of a selected group of orientations. Optical sensing of such alignment enables the flange to be positioned in an orientation appropriate for assembly of the flange pins into the hub holes.

25 Claims, 5 Drawing Sheets

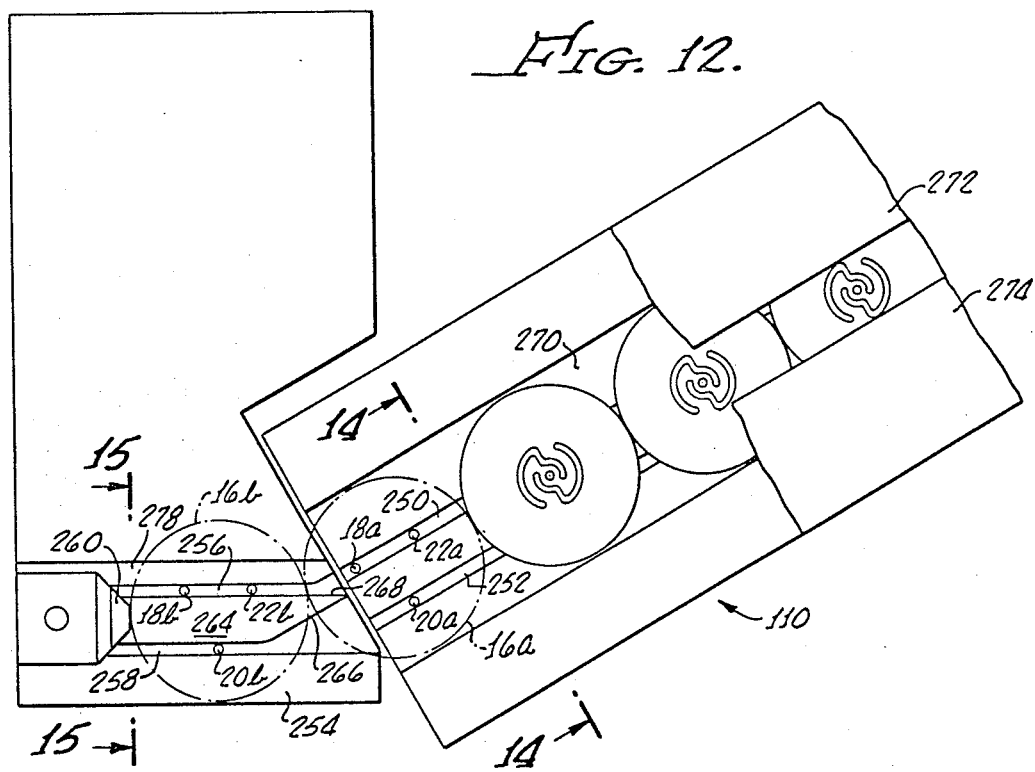
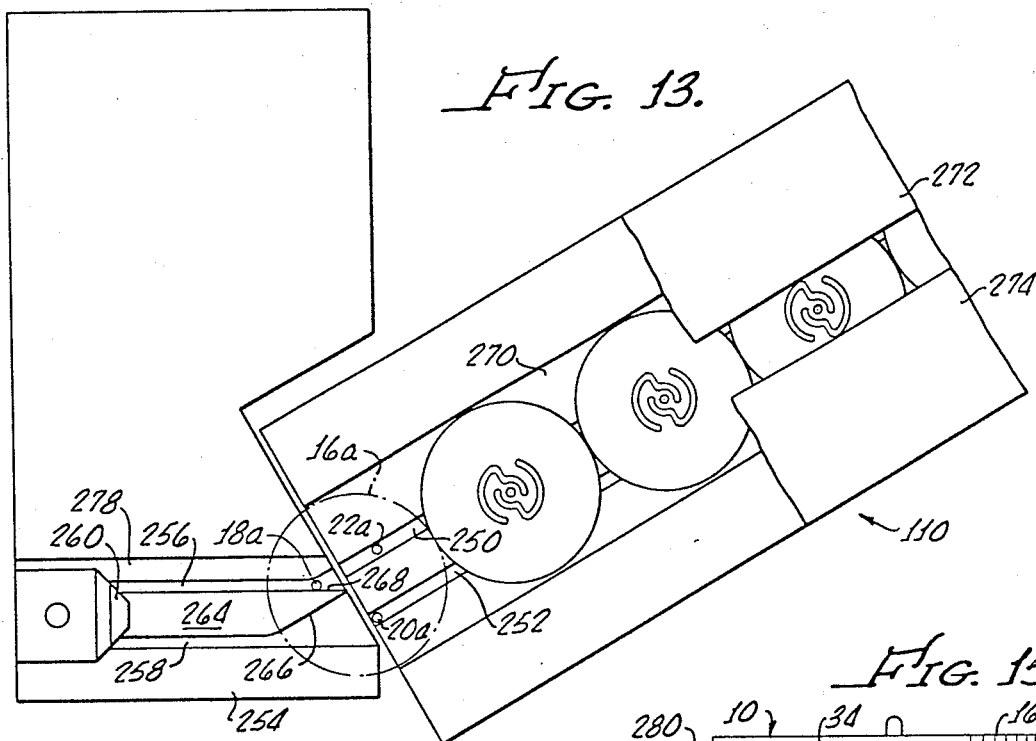
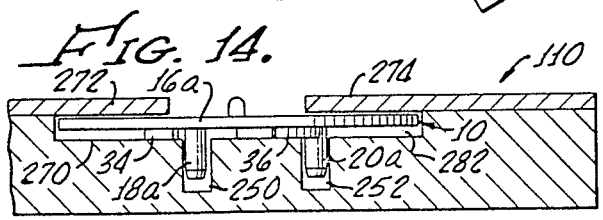
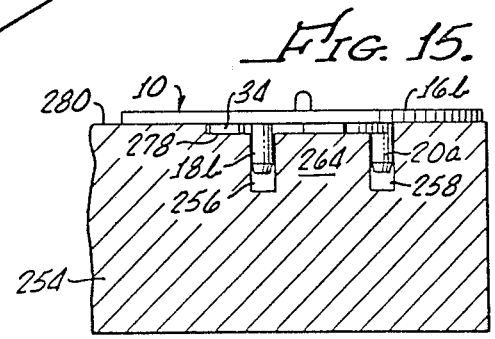

METHOD AND APPARATUS FOR ASSEMBLY OF CASSETTE PULLEY

BACKGROUND OF THE INVENTION

The present invention relates to methods and apparatus for assembly of parts, and more particularly concerns the control of relative orientation of parts to be automatically assembled.

In the automatic assembly of many parts, relative part orientation must be controlled so that the parts will interfit as desired. Where parts are assembled under manual control, the assembly operator can visually inspect the parts and take steps to control the desired orientation. For example, in the manufacture of a cassette pulley of the type adapted for use in a magnetic tape cassette handler, the pulley is formed of a flange having a group of projecting assembly pins which are received in corresponding holes of a hub part, and the two parts are firmly secured together. For assembly the two parts must be relatively oriented about the pulley axis in order to enable the flange part pins to be received in the hub part holes. This can be readily achieved in manual or semi-manual assembly by the operator's visual inspection of the part and resulting manual control of orientation. However, for automatic assembly of of such parts, without the necessity of an operator, automatic means is necessary to determine relative orientation of the parts. A typical flange part, has at least a pair of projecting pins which can be utilized for a selected mechanical alignment. However, all external surfaces of the hub part are essentially circular, and thus no mechanical alignment arrangements are readily available. Therefore, completely automatic assembly of such pulley parts has not previously been accomplished.

Accordingly, it is an object of the present invention to provide for automatic orientation sensing in the automatic machine assembly of parts.

SUMMARY OF THE INVENTION

In carrying out principles of the present invention in accordance with a preferred embodiment thereof, assembly of a part having a hole therein is accomplished by mounting the part on a holder, which itself has a hole that will be aligned with the hole in the part in some positions of the part. Sensing of the occurrence of such alignment provides an indication of relative orientation of the part and its holder, and thus permits control of relative orientation of the part with respect to a second part to which it is to be assembled. More specifically, a hub part of a cassette pulley has a number of recesses formed in one side thereof, some of which have assembly holes for receipt of assembly pins of a flange part. The hub is mounted on holder pins which are received in some of the hub recesses, and alignment of one or more of the holes in the hub part with a hole in the holder part is sensed by an optical sensor to enable selected rotation of the flange part relative to the hub part for proper orientation and assembly.

BRIEF DESCRIPTION OF THE DRAWINGS

FIGS. 12 and 13 are similar views showing an end of the flange feed track 110 with flanges in different positions and with parts broken away; and FIGS. 14 and 15 are sections taken on lines 14—14 and 15—15 of FIGS. 12 and 13 respectively.

DETAILED DESCRIPTION OF THE INVENTION

Figure 1:
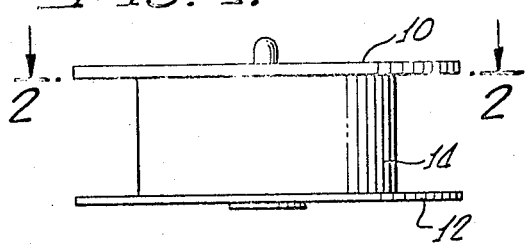
FIG. 1 is a side elevational view of an assembled cassette pulley.
Figure 2:
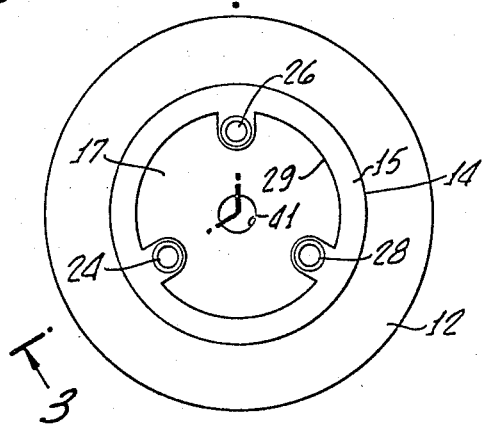
FIG. 2 is a plan view of the inner side of the hub part.
Figure 3:
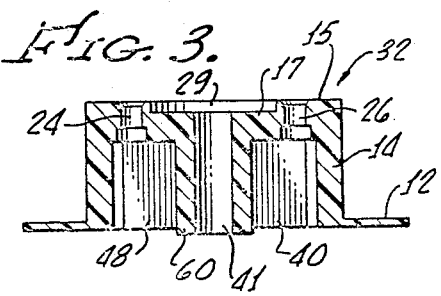
FIG. 3 is an elevation section taken on lines 3—3 of FIG. 2.
Figure 4:
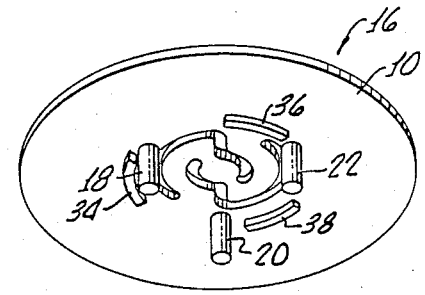
FIG. 4 is an exploded perspective view of the flange and hub parts of the pulley with parts of the hub part broken away.

It will be understood that principles of the present invention are applicable to assembly of a number of different parts of many shapes, functions and configurations. Nevertheless, the invention has been initially embodied in assembly of a cassette pulley, and accordingly, a detailed description of assembly of such a pulley will provide a detailed description of features and applications of the present invention.

Illustrated in FIGS. 1 through 4 is a cassette pulley of the type on which is wound a roll of magnetic tape to be used in a tape playing or recording machine. Such a pulley, for example, may have a diameter of just under one inch and a total thickness of approximately one-third inch, although it will be apparent that principles of the invention are applicable to pulleys of other sizes and to other parts. The pulley is formed in two parts, a flange part, generally indicated at 16, and a hub part, generally indicated at 32. When assembled the pulley comprises first and second flanges 10,12, interconnected by a circular cylindrical hub section 14. Hub section 14 is a cylinder closed at an inner end 15 (FIG. 3) by an inner wall 17 and has the outwardly extending peripheral flange 12 integrally formed at its other end. A plurality of symmetrically disposed assembly pins 18,20,22 project inwardly (downwardly as viewed in FIG. 4) from the inner surface of flange 10 for reception in holes 24,26,28 formed in the inner wall 17 of hub part 32 adjacent the end 15 of cylindrical hub section 14. Inner wall 17 of the hub part is displaced outwardly (downwardly as viewed in FIG. 3) with respect to the end 15 of hub section 14 to provide an upstanding inwardly facing shoulder 29 that forms a guide for and a close frictional fit with the outer surfaces of arcuate flange part ribs 34,36,38 (FIG. 4), which are spaced along a circular line extending just outside the flange pins 18,20,22 and project downwardly from the inner surface of the flange. The ribs are integrally formed with the flange and cooperate with the pins 18,20,22 and hub part holes 24,26,28 to securely position the flange part and hub part relative to one another when the two are assembled. The hub part 32 has an integral central sleeve 60, having a bore 41, and extending outwardly (downwardly in FIG. 3) from the inner wall 17 of cylindrical section 14 to a point slightly beyond the outer surface of flange 12. A plurality (six in the illustrated embodiment) of symmetrically disposed radially extending reinforcing ribs 40,42,44,46,48 and 50 (see FIG. 4) extend radially between the inner wall of the hub section 14 and the central sleeve 60, and longitudinally between inner wall 17 and the outer surface of flange 12. Radially extending ribs evenly numbered from 40 through 50 divide the hub part into six sections, and, together with the central sleeve 60 and cylindrical hub section 14, form six mutually congruent, equally spaced, generally triangular recesses 62,64,66,68,70 and 72 opening downwardly of the hub part (as viewed in FIGS. 1 and 4). In alternate ones of the recesses, such as recesses 62,66, and 70, are formed the apertures 24,26 and 28 respectively. In the remaining recesses 64,68 and 72 the lower face of wall 17 of the hub part is formed with circular bosses 74,76,78 respectively (FIG. 4), which are thickened portions of wall 17 which receive pressure of mold ejecting elements for ejection of the integrally molded hub part from the mold. The relatively thin wall 17 is stiffened by the ejection bosses 74,76,78, but the several recesses are too small to form both a hole and a boss therein. Therefore the ejection bosses are formed in alternate ones of the recesses, and the holes, for receipt of assembly pins 18,20 and 22, are formed in the remaining ones of the recesses. As will be more particularly described below, assembly of the pulley parts comprises relatively orienting the flange and hub parts to align the respective flange pins with the respective hub part holes, inserting the pins into the holes, and securing the two parts together by suitable means.

Figure 5:
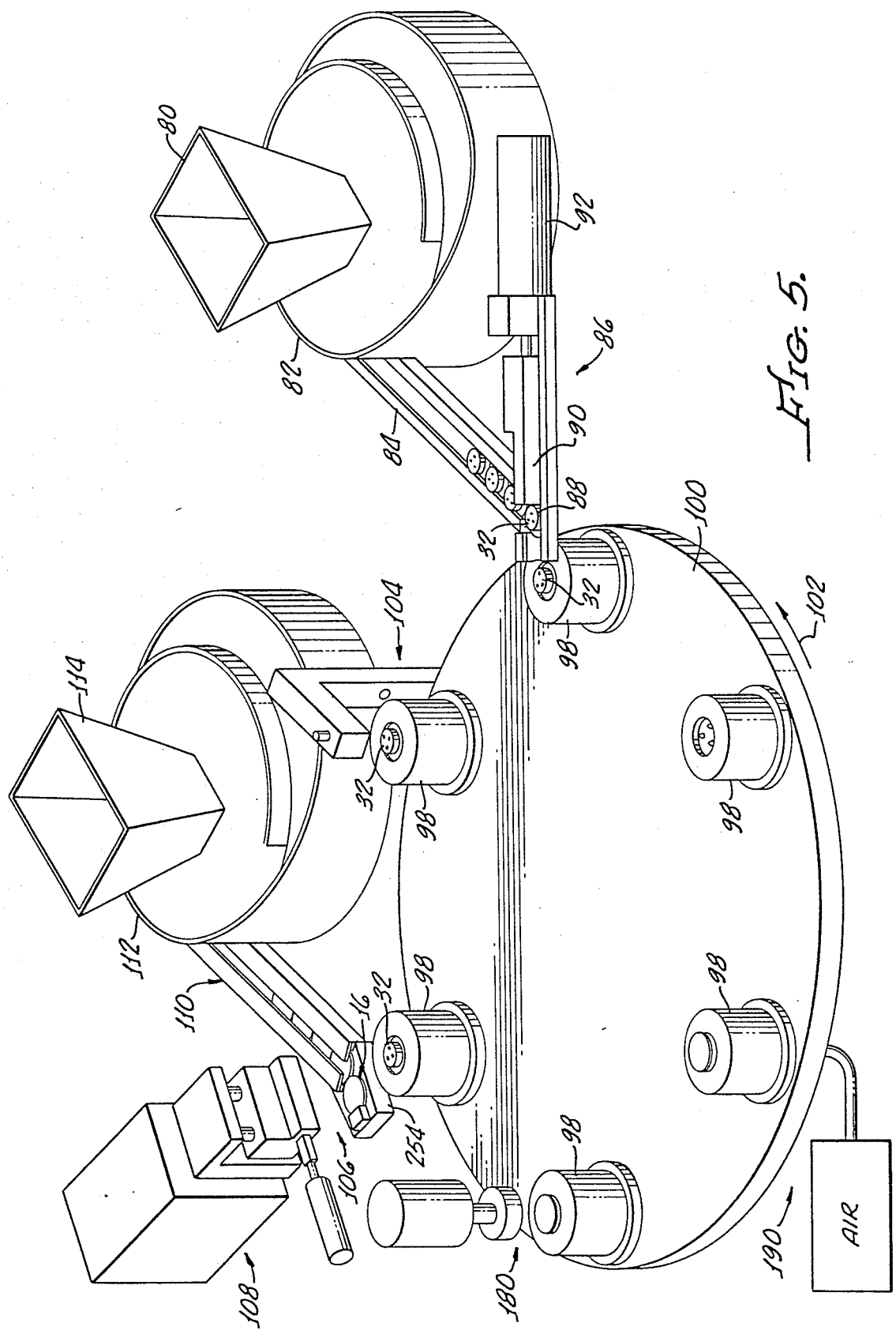
FIG. 5 is a simplified illustration of an automatic assembly system for assembly of the pulley of FIGS. 1 through 4.
Figure 6:
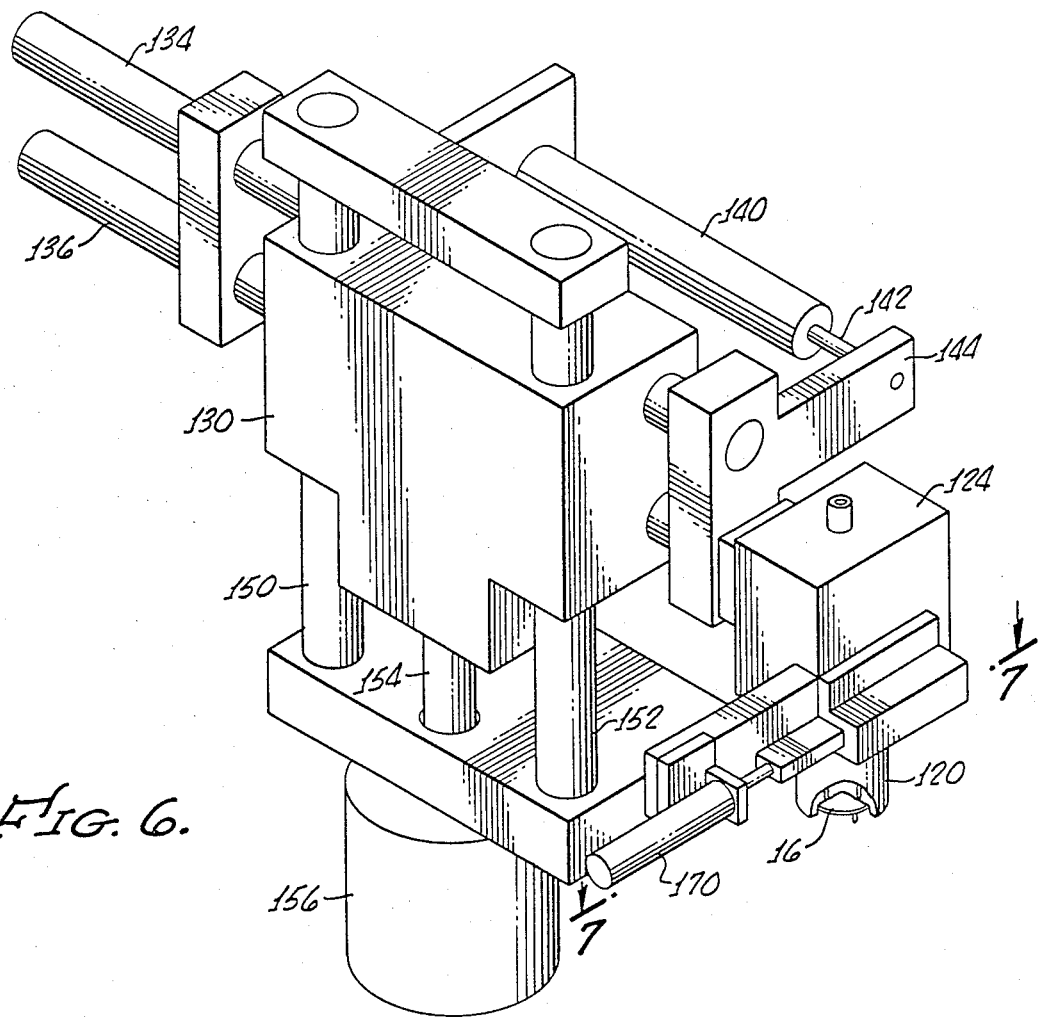
FIG. 6 illustrates a flange holder at an assembly station.

Illustrated in FIG. 5 is an automatic system for assembly of previously molded flange and hub parts. From a hub storage hopper 80 containing a number of hub parts, the latter are loaded by suitable means, which may be manual, into a hub feeder bowl 82, which is a conventional vibratory device that feeds the hub parts along a hub inline track 84 to a hub shuttle loader 86 to be positioned one at a time in a hub receiving or loading area 88 of the loader. A reciprocating shuttle 90 on the loader is driven backwards and forwards by a shuttle loader air cylinder 92, which drives individual hub loader parts, one at a time from the track. The hub parts all fed with their flanges 12 resting on the track 84 and load area 88, with wall 17 of each at an upper end. The shuttle loader slides each hub part on to a respective one of a plurality of hub supports or nests 98 mounted about the periphery of a rotating work table 100 in equally spaced circumferential relation. During rotation of table 100 in the direction of arrow 102, as each nest comes abreast of the hub shuttle loader, air cylinder 92 is actuated to slide one hub part on to the top of the hub part holder 98, which, during continued rotation of the table 100, carries the part to an inspection station 104 at which is performed the hub part orientation sensing forming an element of the present invention. Further rotation of the work table carries the hub part nest and the hub part thereon to an assembly station 106, at which is positioned a pick and place flange handler 108 which receives flanges fed along an in-line flange track 110 from a flange feeder bowl 112 into which the flange parts may be supplied manually or otherwise from an adjacent flange storage hopper 114. Pick and place flange holder 108 comprises a vacuum operated flange holding head 120 for holding a flange 16 thereon, as illustrated in FIG. 6, with its assembly pins projecting downwardly. Head 120 is rotatably mounted upon a slidable carriage 124 that is slidably mounted to a vertically movable platform 130 on a pair of guide rods 134,136 and driven horizontally relative to the platform 130 by means of an air cylinder 140 carried on platform 130 and having a driven piston rod 142 connected to a bracket 144 on the carriage 124. Platform 130 is mounted for vertical motion on guide rods 150,152 and driven by means of a rod 154 and motor or air cylinder 156 in a vertical direction.

Figure 7:
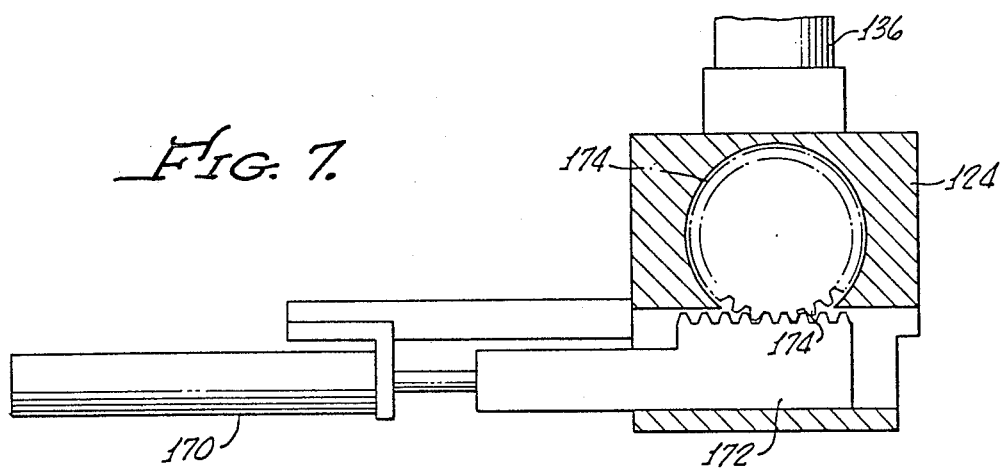
FIG. 7 is another view of the flange holder of FIG. 6.

Vacuum head 120 is rotatable about a vertical axis relative to carriage 124 by means of an air cylinder 170 mounted to the carriage 124 and driving a rack 172, which meshes with a circumferential gear 174 (FIG. 7) fixedly carried by the flange holding head 120.

With this construction, the head 120 can be raised and then retracted to a position over a flange located in a landing 254 at the end of track 110. The head is then lowered to grasp a flange on the landing 254 (see also FIGS. 12 through 15) and then lifted to raise the flange holding head and flange to permit horizontal forward motion of the carriage 124, together with the flange holder head and flange, to a position immediately above a hub part 32 on a hub nest 98 that is positioned by table 100 in an assembly position at the assembly station 106. The head and flange are then lowered to insert the flange pins into the hub apertures to assemble the two parts, the table 100 continues its rotation to a final pressing station 180, which provides additional axial pressure to press the flange and hub parts together, and then the assembled pulley is carried to a discharge station 190 at which an air blower (not shown) blows the assembled pulley from the holder into a suitable receptacle (not shown).

The assembly system has been described up to this point without detailed description of the relative orientation sensing and correction arrangements which form a major part of the present invention. The orientation problems will now be described.

There are two orientation problems. These are, first, a determination of orientation of the hub part as it is carried by its nest 98, and, second, precision orientation of the flange part on landing 254 for pickup by the vacuum head 120. The method and apparatus for orientation of the hub part will be described first.

Figure 8:
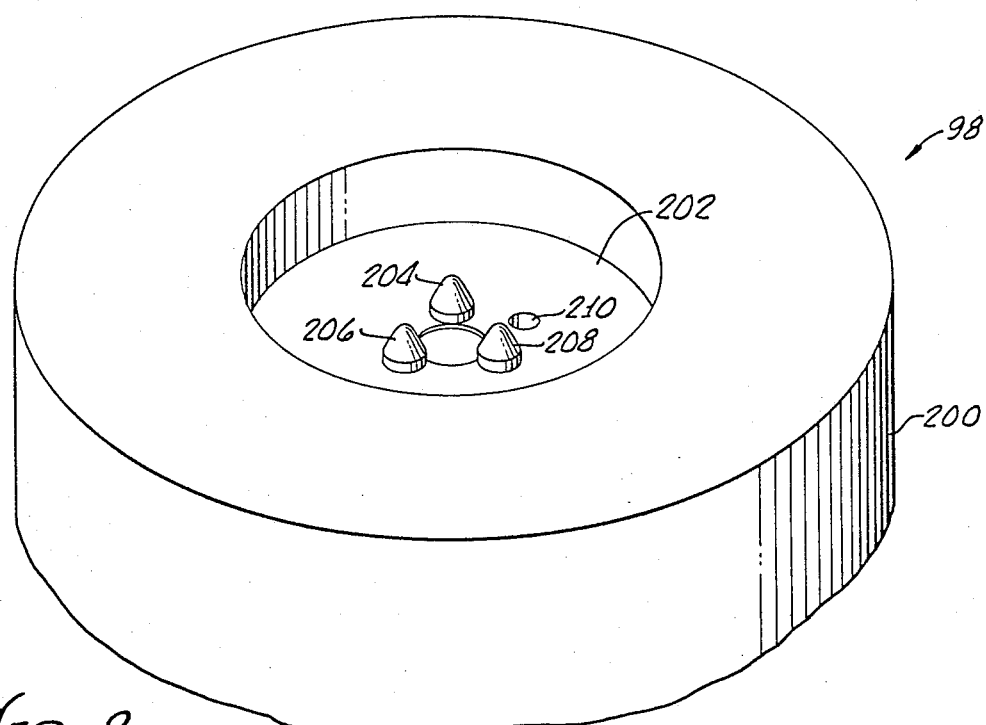
FIG. 8 shows a hub part holder.
Figures 9, 10:
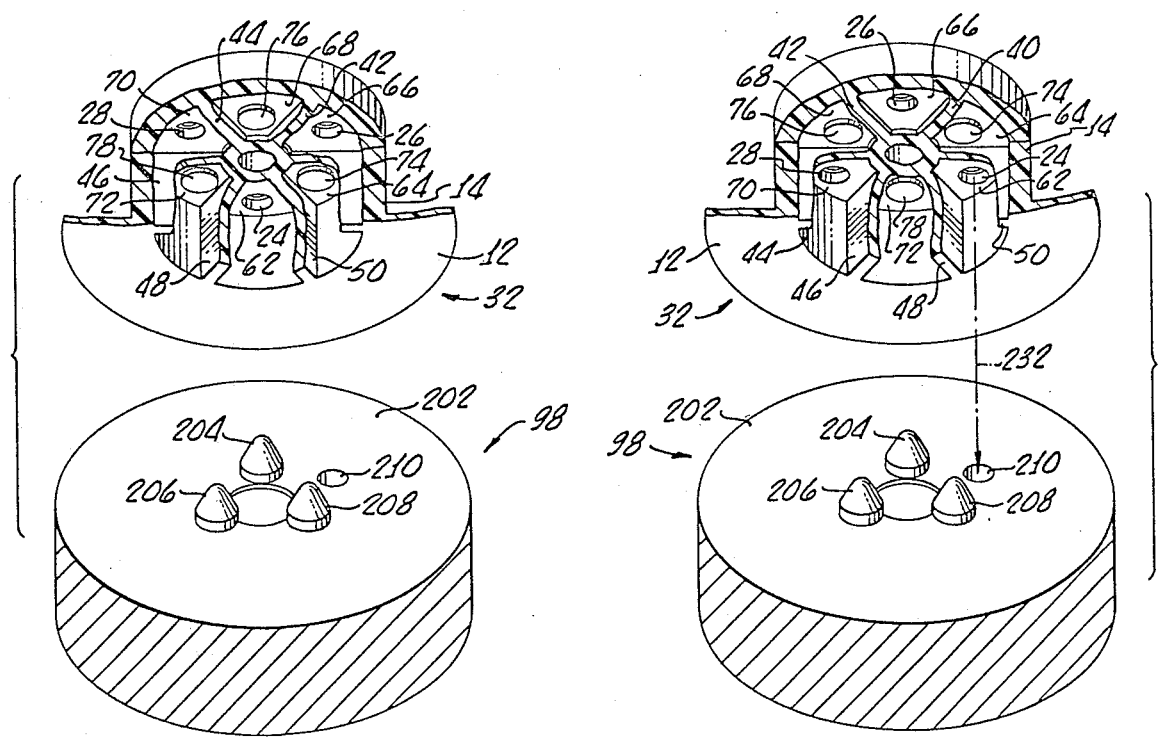
FIGS. 9 and 10 illustrate different positions of relative orientation of the pulley hub part and a portion of the hub holder.

Illustrated in FIG. 8 is a typical one of the hub nests 98, each of which comprises a hollow circular upstanding housing 200 having an upwardly opening circular recess 202 formed on its top to loosely receive flange 12 of a hub part 32. Symmetrically disposed about the center of recess 202 and protruding upwardly from the bottom of the recess are three equally spaced short tapered stub shafts or holding pins 204,206,208, which are positioned and spaced so as to be received in alternate ones of the hub bottom recesses 62,64,66,68,70 and 72. Located between two of the stub pins, such as pins 204,208, and extending through the bottom of recess 202 into the interior of the circular hollow body 200, is a hub holder alignment aperture 210. The stub shafts or holding pins 204,206,208 are positioned to be received in alternate ones of the hub recesses, as previously mentioned, but in any one of six different hub part orientations (e.g. six different positions of rotation about the axis of pulley bore 41). These six orientations may be divided into two groups of three relative orientations of the hub part with respect to the holder. In each of the positions of the first one of these groups of orientations, each holder stub shaft 204,206,208 is received in one of the hub part recesses in which is formed a pin receiving hole. FIG. 9 illustrates one of the three possible positions of relative orientation of this first group. FIG. 9 (and also FIG. 10) show only that part of the nest formed by the bottom of recess 202, together with the holding pins thereon. In the one position of relative orientation shown in FIG. 9, stub shaft 204 of the nest 98 is received in recess 62, stub shaft 206 in recess 70, and stub shaft 208 in recess 66, each of such recesses 62,70,66 having a hub assembly hole. In none of the three positions of this group is alignment hole 210 of the holder aligned with any of the assembly holes.

FIG. 10 illustrates one relative orientation position of hub and holder of a second group of three such relative orientations, in each of which the holder stub shafts are received in hub part recesses having ejection bosses but not assembly holes. Thus, in the relative orientation position illustrated in FIG. 10, stub shaft 204 is received in recess 72, stub shaft 206 is received in recess 68, and stub shaft 208 is received in recess 74. None of these recesses has an assembly hole, but each has a boss 78,76,74 respectively, and in such relative orientation hole 24 of recess 62 is in alignment with nest alignment hole 210. In any one of the three positions of relative orientation in which the holder stub shafts are received in hub recesses having ejection bosses but no holes, one of the hub part holes is in alignment with nest alignment hole 210, whereas in any one of the three positions of relative orientation in which the stub shafts are received in recesses having assembly holes but no bosses, the nest alignment hole is not in registry with any assembly hole of the hub part. Thus, it will be seen that the hub part, when held on nest 98 by the stub shafts 204,206,208 can assume any one of six orientations relative to the holder. These orientations are grouped into two groups of three orientations each. In the first group the holder stub shafts are received in recesses of the holder part in which there are assembly holes. In none of the relative orientations of this first group is there alignment between the nest alignment hole 210 and any one of the hub part assembly holes. In the second group of orientation positions, wherein the holder stub shafts are received in the recesses having ejector bosses but no holes, the alignment hole 210 of the nest is always aligned with one of the three hub part assembly holes.

The flange, on the other hand, can be oriented in any one of three different but effectively equivalent positions by the bowl feeder and track which are provided with grooves that align a pair of the pins of the flange in any one of three orientations, each of which is equal, insofar as assembly is concerned, so that for assembly purposes the effective orientation of the flange in its vacuum holding chuck is always known. Specific methods and apparatus for attaining precision orientation of the flange parts are described below and illustrated in FIGS. 12 through 15. The flange can be assembled to the hub only when the hub is in one of the three positions of the second group of assembly positions, e.g. a position in which each nest stub is received in a hub part recess having an ejector boss but not assembly hole, whereas assembly cannot be accomplished when the hub part is in any one of the first group of hub part positions, in each of which an assembly hole but not an ejector boss of the hub part is aligned with the respective one of the nest stub shafts.

Having this unique arrangement for holding the hub parts in an orientation of one of two groups of relative orientations with respect to the holder, it is only necessary to identify that one of the two groups in which the actual hub part position falls and, thereafter, to appropriately control relative orientation of flange and hub parts. Thus, if it is determined that the hub part is in an orientation relative to the holder, such as illustrated in FIG. 9, for example, the fixed orientation of the flange may be known to be such that the relative orientation of flange and hub parts is correct for assembly, and no further reorientation of the parts with respect to one another is necessary. If it is determined that the hub part is in one orientation of the group illustrated in FIG. 10, wherein the holder stub shafts are received in hub part recesses having ejection bosses therein, the hub part will not be in proper relative assembly orientation, and the flange part or the hub part must be rotated through 60° in the arrangement illustrated herein to bring the parts into proper relative assembly orientation.

Figure 11:
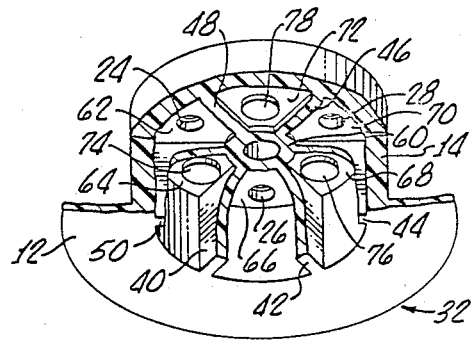
FIG. 11 shows the sensing station of the system of FIG. 5, illustrating orientation sensing embodying the present invention.
Figure 11:
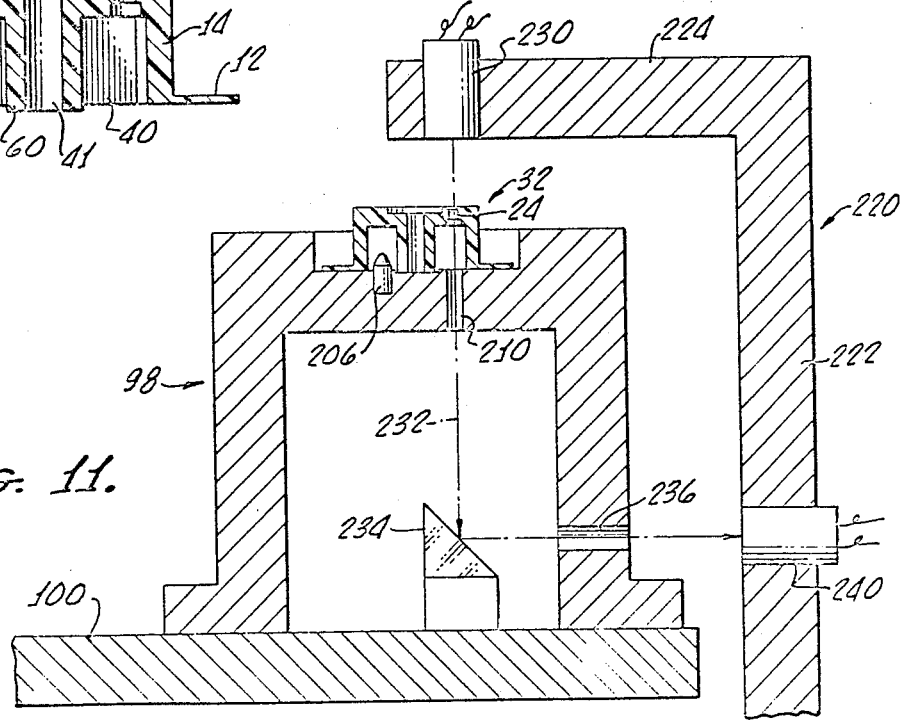

Orientation of the hub part relative to nest 98, which itself, of course, is fixed to the work table 100, is determined by employing the alignment hole 210 and one of the assembly holes 24,26,28 of the hub part. In other words, if nest alignment hole 210 is aligned with any assembly hole (FIG. 10), relative rotation is required. If hole 210 is not aligned with any hole, no relative rotation is required. Sensing of alignment employing these holes is performed at the hub position inspection station 104 by an optical sensing arrangement illustrated in FIG. 11.

At the sensing station 104 is mounted a sensor support 220 having an upstanding base 222 carrying at an upper end thereof a horizontal arm 224 extending radially inwardly over the rotating work table and over the hub part nests 98 which are carried by the table. A light emitting diode 230 carried at the end of arm 224 directs a light beam downwardly along a vertical path 232 which is positioned to pass through the alignment aperture 210 of the holder 98 (when the latter is properly positioned beneath arm 224) to be reflected horizontally therefrom by a reflecting prism or mirror 234 having a reflecting surface positioned at an angle of 45° to the vertical. Light is reflected from the mirror 234 through an aperture 236 in the side of nest 98 for reception by a photodetector 240 carried at a lower portion of the sensor base 222. Accordingly, if the hub part 32 is in one of the group of relative positions in which there is no alignment of an assembly hole with the hole 210, no light is received by photodetector 240 as the table carries the hub part past the hub inspection station 104. Alternatively, if the hub part is in one of its three orientation positions relative to the nest 98 in which one of the assembly holes 24,26,28 is aligned with the alignment hole 210 of the nest, light passes through the aligned apertures, is reflected by the mirror 234 and is received by photodetector 240, which accordingly provides a signal indicating that the hub part is in one or the other position of this group. If the parts are properly oriented for assembly, no further action need be taken. If the parts are not oriented for proper assembly an appropriate signal is sent to activate air cylinder 170 (see FIGS. 6 and 7) which drives rack 172 to rotate gear 174, thereby rotating the vacuum head 120 and the flange 16 through a fixed amount (60° in the described embodiment) sufficient to obtain proper relative assembly orientation of the hub and flange parts. Accordingly, after the table rotates to pass a hub part nest and hub part thereon past the hub inspection station 104, the flange holding head 120 is rotated if required, as determined by the inspection carried out at station 104, so that by the time the hub part reaches the assembly station the flange is in the proper orientation and is positioned directly above the nest and a hub part theron. The orientation signal from the inspection station 104 is sent after a flange has been picked up by head 120. The vacuum head is then lowered to drive the flange pins into the hub part holes, the head and chuck are raised, releasing the flange by turning off the vacuum, the table rotates to carry the assembled pulley to the final pressing station, and the pick and place holder returns to position for fetching the next flange.

Precision alignment of the flange is necessary so that when the flange is lifted by the vacuum head 120 for assembly to the hub part carried on the nest, pins 18,20 and 22 will precisely fit into the flange part holes 24,26,28. As illustrated in FIGS. 12 and 13, the flange parts are fed by vibration along the downwardly inclined track 110 which is formed with first and second grooves 250,252 that respectively receive a pair of the pins, such as pins 18a and 22a for track 250, and the third of this trio of pins, pin 20a, for track 252. The conventional feeder mechanism includes means for ensuring that track 250 will contain two pins of a flange, whereas track 252 will contain only one of the three flange pins. To ensure smooth and accurate sliding motion of the flanges along the length of the downwardly inclined track 110, the grooves 250 and 252 are each made slightly wider than the diameter of the equal diameter pins. This provides sufficient clearance for the pins during the shaking operation so as to enable the flanges to move freely down the length of the track. At the lowermost end of the track there is provided a landing 254 having a horizontal surface, and also provided with pin receiving grooves 256,258. The landing and its grooves are positioned at an angle with respect to the track and its grooves, not only in a vertical plane, but also at an angle in a horizontal plane. In the feeding of the flanges from the track to the landing, the flanges move through the several positions illustrated in FIGS. 12 and 13 and also from a final position on track 110, indicated by flange 16a, shown in phantom in FIG. 12, to the terminal or pickup position illustrated by flange 16b, also shown in phantom in this figure. This phantom showing permits a clearer illustration of the pins and grooves. The terminal position illustrated by flange 16b orients the flange with its pins 18b, 22b and 20b in the grooves 256,258 with the periphery of the flange pressing firmly against a fixed stop or abutment 260 on the landing 254.

Grooves 256,258 are made slightly narrower than are grooves 250,252 to ensure increased precision of orientation of the flange in its pickup position on the landing 254. With a relatively large width of groove, as employed for grooves 250,252, which provides the necessary clearances for free and rapid motion of the flange parts along the track 110, slight variations in orientation of each flange are possible even though the flange pins are still retained within the track grooves. Such orientation variation may be sufficient to prevent reliable assembly of the flange part to the hub part, since mis-orientation may be sufficient to displace the pins from alignment with the hub part holes. For this reason, the grooves in landing 254 are made to closer tolerances and thus significantly decrease the amount of angular mis-orientation that the flanges may experience. In addition it may be noted that the landing has a central rib 264, of which the opposite sides define one side of the grooves 256,258, and which has an inclined flange entry end 266 that provides a clearance or flared groove entry which enables the flange to rotate as it moves from the inclined track 110 to the landing 254. As the flange moves from the end of the track, a leading one of the pair of pins in groove 250, such as, for example, pin 18a of flange 16a, will first hit the surface 268 of central rib 264, as shown in FIG. 13, to thereby slow motion of the flange as it enters the landing grooves and to effectively change the flange orientation to align the pair of pins 18a, 22a in the groove 256, as shown by pins 18b and 22b in FIG. 12.

In the travel along and down inclined track 110, depending ribs 34,36,38 (see also FIG. 4) ride on a rebated surface 270 of the track 110, as shown in FIG. 14, with the bottoms of the pins slightly above the bottoms of the grooves. Here, the flange is spaced slightly above the track surface 270 in which the grooves are formed, thus providing a space 282 between the track surface 270 and the lower surface of the flange. Track 110 has cover plates 272,274 extending over portions of the upper surface of the track, with a gap between adjacent edges thereof to hold the flange parts firmly in the track during their progress along its length.

The cross section of the landing is slightly different than the track cross section. As illustrated in FIG. 15, a rebated surface 278 of the landing at the sides of grooves 256,258 is raised with respect to the upper surface 280 of the landing so that the lower surface of the flange 16b will rest directly on the surface 280. This is in contrast to the track cross section, as can be seen in FIG. 14, where the lower surface of the flange is spaced above the surface 270, providing the space 282. If the cross section of the landing were the same as that of the track, so that a space like space 282 existed between the flange and the surface of the landing, the force and motion of flanges progressing downwardly along the track 110 might force the flange of one of the flange parts (such as flange part 16a of FIG. 12) that is beginning to enter the landing to slide underneath the flange of a part (flange part 16b) already positioned on the landing. Since the hold down cover plates 272,274 are not provided on the landing section (in order to enable the vacuum head to pick up the flange from a position above the landing) it is possible that a flange part 16b on the landing would be lifted and improperly positioned by the action of the vibrating adjacent flange part 16a, which might tend to wedge itself beneath the flange already on the landing.

The angulation of the landing relative to the track 110, in a horizontal plane, not only effects a slowing of the motion of the flange parts along the track, but allows an orientation of the track 110 which will position the entire flange feeding bowl 112 closer to the worktable 100 (FIG. 5).

Decreased clearance of the landing grooves 256,258 with respect to the flange pins provides an increased precision of flange orientation, as previously described. In an exemplary embodiment, where each pin has a diameter of 0.056 inches, groove 250 may have a width of 0.082 inches, and groove 252 a width of 0.077 inches, whereas the landing grooves 256 and 258 have widths of 0.067 and 0.065 inches respectively.

The foregoing detailed description is to be clearly understood as given by way of illustration and example only, the spirit and scope of this invention being limited solely by the appended claims.

I claim:

1. Apparatus for sensing orientation of a part having a plurality of apertures angularly spaced about a center of the part comprising:
   a support,
   means on the support for holding a part in any one of a group of positions of rotation relative to the support about the part center, said support having a hole therein that is aligned with a hole in the part when the support holds the part in at least one of said positions, and
   means for sensing mutual alignment of the hole in the support and a hole in the part.

2. The apparatus of claim 1 wherein said means for sensing mutual alignment comprises a second support, and means on said first support for reflecting to said second support a light beam passing through the hole in said first support.

3. The apparatus of claim 2 wherein said means for sensing alignment comprises means on the second support for projecting a light beam to said support hole and sensor means on said second support for receiving reflected light, said means for reflecting comprising a reflector mounted on the first support for reflecting light from said support hole to said sensor means.

4. In the assembly of parts wherein first and second parts are required to have a predetermined relative rotational orientation about an orientation axis for the assembly, and wherein a first one of the parts has a hole therethrough and is loaded upon a support and held in any one of a group of different orientations about the orientation axis, and wherein said support has a hole that is aligned with the hole in said first part when said first part is in at least one of said orientations, a method of effecting relative orientation of the first and second parts for assembly comprising the steps of:
   sensing occurrence of alignment of the hole in the part with the hole in the support, thereby sensing if the part on the support has one orientation or another, and
   controlling relative orientation of the first and second parts according to the sensed alignment of said holes.

5. The method of claim 4 wherein said step of sensing occurrence of alignment comprises the steps of directing a light beam along a predetermined optical path that extends through the hole in said support, and determining whether or not said light beam passes through a hole in said first part.

6. The method of claim 5 wherein said step of directing a light beam comprises directing a light beam from a second support along said optical path, and redirecting light traveling along said path from the first mentioned support along a second optical path to a sensor mounted on the second support.

7. The method of claim 6 wherein said second support is positioned at a sensor station and including the step of moving said first mentioned support past said sensor station, thereby moving said hole of said first mentioned support along a line intersecting said optical path, and wherein said steps of controlling relative orientation comprise the steps of effecting relative rotation of said first and second parts through a predetermined angle of rotation about said orientation axis according to whether or not light reflected from said first mentioned support is received at the sensor on said second fixed support.

8. Apparatus for assembling a cassette pulley including a hub part and a flange part, said hub part having a plurality of recesses arranged around a hub center and wherein some of said recesses are formed with a hub assembly hole, said flange part having a plurality of projecting pins each adapted to be received in a respective one of the assembly holes of the hub part when the hub and flange parts are relatively oriented about the hub center in a selected assembly orientation, said apparatus comprising:
   a hub holder having a plurality of hub holding stub shafts adapted to be received in hub recesses for holding and orienting a hub part in any one of a predetermined number of orientations,
   an alignment sensing aperture in said hub holder positioned with respect to the hub holding stub shafts for alignment with an aperture in a hub part when such hub part is in at least one of said orientations thereof and positioned to be out of alignment with all of the holes in the hub part when the hub part is in another of said orientation thereof,
   an orientation sensing station,
   means for moving said hub holder to said orientation sensing station,
   means at said orientation sensing station for directing a light beam along a path extending through the alignment sensing aperture of a hub holder at said station,
   sensor means at said orientation sensing station for receiving a light beam passing through said hub holder aperture,
   an assembly station,
   a flange holder at said assembly station,
   means at said assembly station for feeding a flange to said flange holder with a predetermined orientation,
   means for moving said hub holder to said assembly station,
   means at the assembly station responsive to said light sensor means for controlling relative orientation of said hub and flange parts to a predetermined assembly orientation, and
   means at the assembly station for assembling the flange part to the hub part.

9. The apparatus of claim 8 wherein said hub holder comprises a hollow body having top and bottom portions, said hub holding stub shafts being mounted on said top portion and offset from said sensing aperture, and a reflector mounted in said bottom portion and positioned to receive and laterally reflect light passing downwardly through said sensing aperture.

10. The apparatus of claim 9 wherein said means at said orientation sensing station for directing a light beam and said sensor means comprise a sensor support having a vertically extending base, a horizontal arm carried at an upper part of said base, and light emitter and detector elements on said sensor support, one of said elements being mounted on said arm and the other of said sensors being mounted on a part of said base below said arm.

11. The apparatus of claim 8 including a reflector on said hub holder for reflecting light passing through said hub holder alignment sensing aperture to a sensor remote from the hub holder, when the hub holder is at said orientation sensing position.

12. The apparatus of claim 8 wherein said orientation sensing station includes light emitting means on one side of a hub holder at said orientation sensing position and light sensing means on another side of the hub holder at said orientation sensing position, and further including a reflector mounted on the hub holder for reflecting light between said light emitting means and said light sensing means.

13. The apparatus of claim 12 including means for mounting said flange holder at said assembly station for a predetermined amount of rotation about an orientation axis, and means responsive to said sensor means for rotating said flange holder about an orientation axis.

14. The apparatus of claim 8 wherein said flange part includes a flange body having a plurality of mutually spaced projecting pins, wherein said means at said assembly station for feeding a flange to said flange holder comprises a track having first and second parallel mutually spaced grooves adapted to receive the pins of said flange part, and having a track end, means for driving flange parts along said track, and a landing positioned adjacent said track end and having first and second mutually spaced and parallel landing grooves each positioned to receive pins of flange parts moving along said track, the grooves of said landing having a width less than the width of the grooves of said track, whereby said flange parts have a relatively large degree of freedom of angular motion in said track, and said flange parts have a decreased freedom of angular motion in said landing, thereby to more precisely orient said parts in said landing.

15. The apparatus of claim 14 wherein the grooves in said landing extend at an angle with respect to the grooves in said track, and wherein said landing grooves each includes an enlarged entry portion adjacent the grooves in said track.

16. A method of assembling a cassette pulley having a pulley flange part in the form of a substantially flat disc having a plurality of assembly pins mutually spaced about a disc center and projecting from the plane of the disc, and including a pulley hub part having a plurality of radial reinforcing ribs extending radially from a hub center and dividing the hub into a plurality of recessed areas, alternate ones of said recessed areas having an assembly hole, and each of said assembly holes configured and positioned to receive a respective one of said assembly pins of said cassette pulley flange part when said parts are in one of a selected group of relative orientations about an orientation axis extending axially of said hub part, said method comprising the steps of:
    loading the hub part upon a hub support in one orientation of first and second groups of orientations,
    projecting a light beam along a sensing path at an orientation detection station,
    moving the hub support and thereby moving a hub part on the hub support along a path in which one of the holes in a hub part on the support intersects said sensing path if the hub part on the hub support at said orientation detection station is in an orientation of said first group of orientations, and wherein none of the holes in the hub part on the hub support intersect the sensing path when the hub part is in an orientation of said second group of orientations,
    detecting passage of said light beam through a hole in a hub part on said hub support at said orientation detection station,
    moving the hub support and a hub part thereon to an assembly station,
    loading a flange part upon a flange support at the assembly station with a predetermined assembly orientation, and
    changing the relative orientations of said hub support and flange support according to whether or not passage of a light beam through a hole in a hub part was detected.

17. The method of claim 16 including the steps of mounting the hub support upon a table, said step of moving the hub support comprising moving the table, and thereby moving the hub support, to said orientation detection and assembly stations, said steps of projecting and detecting comprising projecting a light beam at said orientation detection station along a vertical path through a hole in a hub support at the orientation detection station, and receiving light passing through a hole in the hub support at the sensing station and reflected from the hub support, said step of changing relative orientations comprising rotating said flange support by a predetermined amount.

18. For use with a cassette pulley hub part having a plurality of mutually adjacent recesses circularly arranged around the center of the hub part, some of said recesses having assembly holes and the others having no assembly holes, a method of orienting the hub part to align the assembly holes with assembly pins of a flange that is to be assembled to the hub part, said method comprising the steps of:
    loading the hub part upon a hub part holder having a plurality of holder stub shafts respectively received in different ones of said recesses to thereby hold the hub part on the holder in one orientation of first and second groups of orientations with respect to the holder,
    providing an alignment hole in the holder between some of said holder stub shafts,
    directing a light beam along a path extending through the alignment hole of the holder, and
    determining whether or not the light beam passes through the holder alignment hole to thereby signal whether or not an assembly hole of the hub part is in alignment with the alignment hole, one of said alignment holes being aligned with the hub part holder alignment hole in each position of said first group of orientations and said alignment hole being blocked by said hub part in each position of said second group of positions of said hub part relative to said holder, whereby detection of passage of the light beam through the alignment hole indicates a relative orientation of the hub part with respect to the holder that is one of said first group of orientations.

19. Apparatus for assembling a cassette pulley having a hub part and a flange part, said hub part having a plurality of holes angularly spaced about a center of the hub part, said apparatus comprising:
    a support,
    means on the support for holding the hub part in any one of a group of positions of rotation relative to the support about the hub part center, said support having a hole therein that is aligned with the hole in the hub part when the support holds the hub part in at least one of said positions, and
    means for sensing mutual alignment of the hole in the support and a hole in the hub part.

20. The apparatus of claim 19 wherein said means for sensing mutual alignment comprises a second support and means on said first support for reflecting to said second support a light beam passing through the hole in said first support.

21. The apparatus of claim 20 wherein said means for sensing alignment comprises means on the second support for projecting a light beam to said support hole and sensor means on said second support for receiving reflected light, said means for reflecting comprising a reflector mounted on the first support for reflecting light from said support hole to said sensor means, and means responsive to said sensor means for controlling relative orientation of said hub and flange parts.

22. A method of assembling a cassette pulley having a flange part and a hub part, said parts being required to have a predetermined relative rotational orientation about an orientation axis for assembly of the parts to one another, a first one of said parts having a hole there through, said method comprising the steps of:
   loading said first part upon a support having a hole therein,
   holding the first part on the support in one of a group of different orientations about the orientation axis, said support hole being aligned with the hole in said first part when said first part is in at least one of said different orientations,
   sensing alignment of the hole in the first part with the hole in the support, thereby sensing if the first part on the support has one orientation or another relative to the support, and
   controlling relative orientation of the flange part and hub part according to sensed alignment of said holes.

23. The method of claim 22 wherein said step of sensing alignment comprises the steps of directing a light beam along a predetermined optical path that extends through the hole in said support, and determining whether or not said light beam passes through a hole in said first part.

24. The method of claim 23 wherein said step of directing a light beam comprises directing a light beam from a second support along said optical path and redirecting light traveling along said path from the first mentioned support along a second optical path to a sensor mounted on the second support.

25. The method of claim 24 wherein said second support is positioned at a sensor station and including the step of moving said first mentioned support past said sensor station, thereby moving said hole of said first mentioned support along a line intersecting said optical path, and wherein said steps of controlling relative orientation comprise the steps of effecting relative rotation of said first and second parts through a predetermined angular rotation about said orientation axis according to whether or not light reflected from said first mentioned support is received at the sensor on said second support.

* * * * *